United States Patent
Kuehne

(10) Patent No.: US 11,155,167 B2
(45) Date of Patent: Oct. 26, 2021

(54) METHOD FOR OPERATING A DISPLAY DEVICE IN A MOTOR VEHICLE AND DISPLAY SYSTEM FOR A MOTOR VEHICLE

(71) Applicant: AUDI AG, Ingolstadt (DE)

(72) Inventor: Marcus Kuehne, Beilngries (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 17/255,944

(22) PCT Filed: Sep. 7, 2018

(86) PCT No.: PCT/EP2018/074167
§ 371 (c)(1),
(2) Date: Dec. 23, 2020

(87) PCT Pub. No.: WO2020/001797
PCT Pub. Date: Jan. 2, 2020

(65) Prior Publication Data
US 2021/0268904 A1 Sep. 2, 2021

(30) Foreign Application Priority Data
Jun. 26, 2018 (DE) ...................... 10 2018 210 390.9

(51) Int. Cl.
*B60K 35/00* (2006.01)
(52) U.S. Cl.
CPC ...... *B60K 35/00* (2013.01); *B60K 2370/1529* (2019.05); *B60K 2370/166* (2019.05);
(Continued)

(58) Field of Classification Search
CPC ...... B60K 2370/1529; B60K 2370/177; B60K 2370/175; B60K 2370/166; B60K 2370/1868
See application file for complete search history.

(56) References Cited

U.S. PATENT DOCUMENTS

| | | |
|---|---|---|
| 2015/0100179 A1 | 4/2015 | Alaniz et al. |
| 2017/0142470 A1 | 5/2017 | Tsuchida et al. |
| 2017/0352185 A1* | 12/2017 | Bonilla Acevedo ....... B60J 1/20 |

FOREIGN PATENT DOCUMENTS

| | | |
|---|---|---|
| CN | 107945284 | 4/2018 |
| DE | 10 2010 036 666 A1 | 2/2011 |

(Continued)

OTHER PUBLICATIONS

International Search Report (Forms PCT/ISA/210; PCT/ISA/220); dated Mar. 25, 2019, in International Patent Application No. PCT/EP2018/074167.

(Continued)

*Primary Examiner* — Michael D Lang
(74) *Attorney, Agent, or Firm* — Staas & Halsey, LLP

(57) ABSTRACT

A plurality of virtual individual sequences that can be reproduced by use of a display device in a motor vehicle are provided. At least some of the provided individual sequences are reproduced by use of the display device while traveling a route with the motor vehicle. A selection and determination of a reproduction order of the individual sequences are effected so as to match a characteristic of the route and such that the individual sequences connect a specified entry sequence and end sequence to form a coherent experience.

18 Claims, 1 Drawing Sheet

(52) U.S. Cl.
CPC .. *B60K 2370/175* (2019.05); *B60K 2370/177* (2019.05); *B60K 2370/1868* (2019.05)

(56) References Cited

FOREIGN PATENT DOCUMENTS

| | | |
|---|---|---|
| DE | 10 2012 214 988 A1 | 4/2013 |
| DE | 10 2014 220 053 A1 | 7/2015 |
| DE | 10 2015 003 948 A1 | 9/2016 |
| DE | 10 2016 120 427 A1 | 4/2017 |
| DE | 10 2018 210 390.9 | 6/2018 |
| WO | PCT/EP2018/074167 | 9/2018 |

OTHER PUBLICATIONS

Written Opinion (Form PCT/ISA/237); dated Mar. 25, 2019, in International Patent Application No. PCT/EP2018/074167.
International Preliminary Report on Patentability (IPRP) dated Oct. 30, 2020, in International Patent Application No. PCT/EP2018/074167, including Transmittal Letter and Amended Claims, with translation of IPRP, Transmittal Letter, an Amended claims.
Chinese Office Action dated Jun. 1, 2021, in Chinese Patent Application No. 201880095093.7, 5 pages.
Notification of Transmittal of Translation of International Preliminary Report on Patentability dated Dec. 30, 2020, with International Preliminary Reporton Patentability (IPRP) dated Oct. 29, 2020, in International Patent Application No. PCT/EP2018/074167, including English language translation (22 total pages).

\* cited by examiner

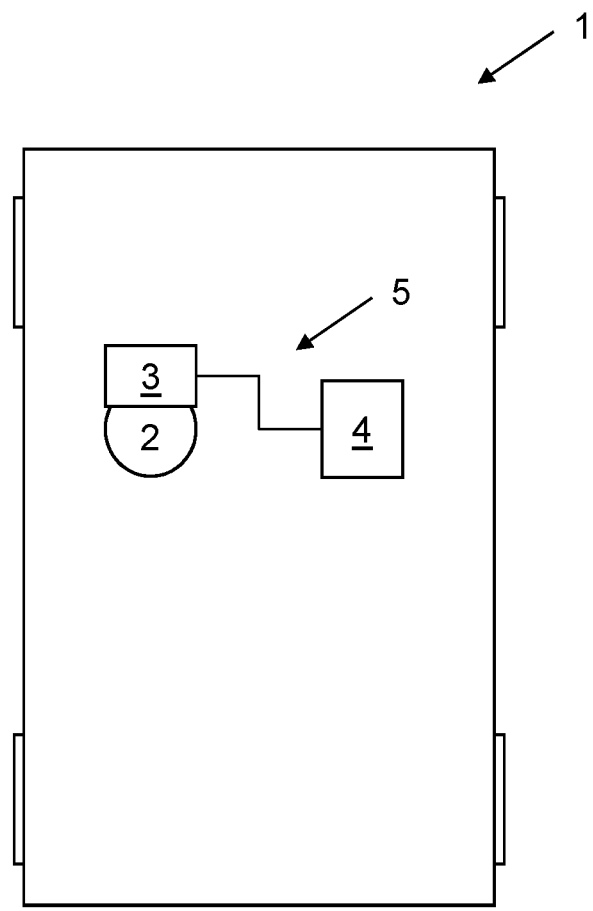

METHOD FOR OPERATING A DISPLAY DEVICE IN A MOTOR VEHICLE AND DISPLAY SYSTEM FOR A MOTOR VEHICLE

CROSS REFERENCE TO RELATED APPLICATIONS

This application is a U.S. national stage of International Application No. PCT/EP2018/074167, filed on Sep. 7, 2018. The International Application claims the priority benefit of German Application No. 10 2018 210 390.9 filed on Jun. 26, 2018. Both the International Application and the German Application are incorporated by reference herein in their entirety.

BACKGROUND

Described herein is a method for operating a display device in a motor vehicle when traveling a route with the motor vehicle. Also described herein is a display system for a motor vehicle for performing such a method.

In the future, a wide variety of entertainment offers for vehicle occupants, including drivers, of motor vehicles will very likely become increasingly established, in particular due to the advances in the field of autonomous driving. German Patent Application No. 10 2014 220 053 A1, for example, describes a system and a method for representing a virtual reality when traveling with a motor vehicle. A virtual reality fishing game can be displayed, making it possible for a vehicle occupant wearing the virtual reality glasses to virtually go fishing during the journey with the motor vehicle. If the motor vehicle in which a wearer of virtual reality glasses sits drives through mountainous terrain during the day, a visual appearance and a terrain within the fishing game can be correspondingly adapted based on the location and the orientation of the motor vehicle. When the location of the motor vehicle is known, it is even possible for example to select for the game a type of fish that lives in the area through which the motor vehicle is driving at the time. Movements of a virtual boat inside the game, for example, can also be adapted to movements of the vehicle and/or of the person wearing the virtual reality glasses.

German Patent Application No. 10 2010 036 666 A1 describes an intelligent music selection in vehicles. The music selection is adapted, for example, in dependence on a journey's duration and a place at which a driver of the vehicle is making a stop for refueling purposes.

German Patent Application No. 10 2012 214 988 A1 describes a method for performing an augmented reality game when traveling with a motor vehicle. For example, a driving-related instructional game can be reproduced. A vehicle occupant playing the game can thus, inside the game, follow the vehicle in which they are sitting.

SUMMARY

One or more aspects of the disclosure include providing a solution with which a coherent virtual entertainment option that seems particularly realistic can be offered to a vehicle occupant when traveling a route in a motor vehicle.

This may be achieved by a method for operating a display device in a motor vehicle and by a display system having the features described herein. Advantageous refinements with expedient and non-trivial developments are further described herein.

In the method described herein for operating a display device in a motor vehicle, a plurality of virtual individual sequences that can be reproduced by use of the display device are provided while traveling a route with the motor vehicle. The display device can be, for example, virtual reality glasses, augmented reality glasses, mixed reality glasses, or a display device that is integrated in a window of the motor vehicle, in particular in the form of a contact-analog display. At least some of the individual sequences provided are reproduced by use of the display device while the motor vehicle is traveling the route, wherein a selection and determination of a reproduction order of the individual sequences are effected so as to match a characteristic of the route and such that the individual sequences connect a specified entry sequence and end sequence to form a coherent virtual experience.

Aspects of the disclosure are based on the finding that distance-dependent virtual experiences in which a vehicle occupant can undergo a variety of virtual experiences are highly likely to become established, at least once the use of autonomous driving begins. It is possible using the method described herein that specific sections of the virtual experience are adapted to a respective distance characteristic of the relevant route, ensuring that, for example, an action sequence with many changes in direction is accommodated over a stage of the journey including many curves, while other virtual experiences are used for example when driving uniformly on the motorway or through cities or towns.

Provision is then made in the method described herein that a large number of provided virtual individual sequences are enclosed by a defined starting sequence and end sequence and the individual sequences located between the two are dynamically adapted to the characteristic of the route. In other words, the entry sequence and exit sequence are used to build a story that is coherent in itself, wherein the individual sequences connect the entry sequence and the end sequence to form a coherent experience.

The selection of the individual sequences thus takes place in accordance with the characteristic of the route. The characteristic of the route can be described, for example, by way of its height profile, its curve profile, a respective type of road type to be traveled, the duration of the route, and the like. Owing to the fact that individual sequences are selected and reproduced so as to match the characteristic of the route and thus the respective characteristic of individual route sections, the result is a virtual experience that seems particularly realistic for the vehicle occupant viewing the display device. The reproduction sequence of the selected individual sequences is specified here such that the individual sequences reproduced in succession by use of the display device form a coherent story coherently connected by the specified entry sequence and end sequence.

The vehicle occupant traveling the route with the motor vehicle thus experiences a series of virtual individual sequences that, framed by the entry sequence and the end sequence, produce a coherent story. The entry sequence, end sequence and the individual sequences lying between them can for example be part of a virtual game, of a movie, or the like.

If the traveled route has, for example, straight route sections on which the motor vehicle rarely accelerates or does not accelerate at all, individual sequences that match these route sections can be selected. Provision may be made in the case of the individual sequences, for example, that the vehicle occupant likewise performs only calm virtual movements or hardly any virtual movements within the individual sequences. If the route contains route sections, for example, with many curves, corresponding individual sequences can be selected and played by the display device. In these individual sequences, the vehicle occupant then moves for example quite quickly to the left and right, or the like, within a virtual environment. Not only is the route characteristic taken into account but also the criterion that the chronological series of the individual sequences fits together in terms of content. The individual sequences matching the respective characteristic of individual route sections thus ensure a virtual experience that seems highly realistic because virtual movements within the individual sequences match the real vehicle movements and, in addition, the individual sequences follow one another so as to fit together in terms of content.

Overall, the method described herein allows a vehicle occupant traveling a route with the motor vehicle the option of consuming a coherent series of virtual individual sequences that seem highly realistic.

An advantageous embodiment described herein makes provision that individual sequences that have already been reproduced earlier for the vehicle occupant are not selected again. Over the course of the method it is thus possible that the individual sequences that have already been reproduced or used are remembered. To create a specific variance and avoid repetitions within an experience, the individual sequences that have already been reproduced earlier can be left out on a subsequent journey. For example, it is also possible to count automatically by use of a counter the number of journeys the vehicle occupant has undertaken since the use of a very specific individual sequence. If the counter exceeds a specified value, the relevant individual sequence is released so as to be used again. It is also possible that the time that has passed since a very specific individual sequence was used is automatically tracked by use of a timer. If the timer exceeds a specified value, the relevant individual sequence is released so as to be used again.

A further advantageous embodiment described herein makes provision that individual sequences that have already been reproduced earlier for the same route are not selected again. It is thus also possible to avoid repetitions of individual sequences based on the routes, as a result of which repetitions of the individual sequences can also be avoided for those very specific routes.

According to a further advantageous embodiment described herein, provision is made that a plurality of different virtual experiences are offered to the vehicle occupant, wherein the entry sequence and end sequence are specified so as to match a virtual experience that is selected by the vehicle occupant. For example, the vehicle occupant is free to select from the different virtual experiences, wherein the selection specifies the entry sequence and end sequence that appropriately frames or embeds the series of the virtual individual sequences. The virtual experiences are for example offered so as to match the characteristic of the route. This makes sense in particular when the entire route is already known before the journey begins. For example, it is possible to offer only those virtual experiences that also match the characteristic of the route, for example with respect to a height profile, curve profile, or duration of the route. This benefits a particularly realistic reproduction and a particularly realistic experience of the relevant virtual experiences while traveling the route.

A further advantageous embodiment described herein makes provision that monitoring is performed to determine whether the vehicle occupant abandons the reproduction of the individual sequences, wherein this is taken into account when selecting the individual sequences again during a future journey. In particular in the case of a large number of journeys taken, it is thus possible for example to determine abandonment rates and to use them when selecting the individual sequences again. In other words, it is thus possible that a vehicle occupant or other vehicle occupants are also monitored to determine whether they abandon the respectively reproduced virtual experiences. In particular, it is possible in this case to take into account whether the abandonment is caused by very specific selected individual sequences. In this way it is possible to continuously adapt the offering and reproduction of the individual sequences to the preferences of the vehicle occupant or to preferences of further vehicle occupants.

In a further advantageous refinement described herein, provision is made that an interrogation takes place as to how much the vehicle occupant enjoyed the reproduction of the individual sequences, wherein a future selection of the individual sequences depends on such an assessment by the vehicle occupant. Direct feedback from the vehicle occupant or further vehicle occupants is thus also possible, wherein the feedback, that is to say the assessment of the vehicle occupant, is incorporated in the future selection of the individual sequences. In this way, the provision and reproduction of virtual experiences during the journey with the motor vehicle can be adapted successively to the preferences of the vehicle occupant or further vehicle occupants and improved.

A further advantageous embodiment described herein makes provision that an interrogation takes place as to how much the vehicle occupant enjoyed the reproduction order of the individual sequences, wherein a future determination of a reproduction order of the individual sequences is made in dependence on such an assessment by the vehicle occupant. For example, it is conceivable that the vehicle occupant enjoyed the selected individual sequences as such but did not perceive the chronological series of the selected individual sequences as optimal. It is thus possible that the vehicle occupant can make an assessment and/or provide suggestions to adapt a future reproduction order according to their preferences.

A further advantageous embodiment described herein makes provision that data relating to a height profile, a curve profile, the type of road, and/or a duration for the route are provided and the characteristic of the route is derived based thereon. This can be accomplished both before the journey along the route and continuously while traveling the route. The data can be provided for example by use of a navigation system of the motor vehicle, by use of sensors of the motor vehicle, by use of sensors of the display device, by use of sensors of a smartphone or the like before the journey is started and/or continuously while traveling the route. It is thus possible to determine the characteristic of the route particularly exactly both in advance and while traveling the route so as to allow respective virtual experiences to be adapted thereto particularly well.

The display system described herein for a motor vehicle includes a display device and a control device for carrying out the method described herein or an advantageous embodiment of the method described herein.

The display device can be virtual reality glasses, augmented reality glasses, mixed reality glasses, or a display device integrated in a window of the motor vehicle. For virtual reality glasses, the vehicle occupant is visually screened off from the real environment. For augmented reality glasses, mixed reality glasses, or the display device that is integrated in the window of the motor vehicle, by contrast, the vehicle occupant continues to visually perceive their real environment. However, the real environment is superimposed with the entry sequence and end sequence and the virtual individual sequences by use of the display device. In other words, individual virtual elements superpose or augment reality.

Advantageous refinements of the display system described herein are considered to be advantageous refinements of the method described herein and vice versa, wherein the display system in particular has features for performing the method operations.

Further advantages, features and details of the disclosure become apparent from the following description of example embodiments and with reference to the single drawing. The features and combinations of features mentioned above in the description and the features and combinations of features shown alone in the description of the single drawing below and/or in the single drawing itself can be used not only in the respectively specified combination but also in other combinations or on their own without departing from the scope of the disclosure.

BRIEF DESCRIPTION OF THE DRAWING

These and other aspects and advantages will become more apparent and more readily appreciated from the following description of the example embodiments, taken in conjunction with the accompanying single drawing which is a highly schematic illustration of a motor vehicle in which a vehicle occupant wearing virtual reality glasses is sitting.

DETAILED DESCRIPTION

Reference will now be made in detail to examples which are illustrated in the accompanying single drawing.

A motor vehicle 1 is shown in the single drawing in a highly schematic illustration. A vehicle occupant 2 wearing virtual reality glasses 3 is sitting in the motor vehicle 1. Also provided is a control device 4, which is designed for controlling the virtual reality glasses 3. The virtual reality glasses 3 and the control device 4 together form a display system, in the example embodiment a virtual reality system 5. The control device 4 can be part of the virtual reality glasses 3, for example. Alternatively, the control device 4 may be installed in the vehicle, for example, wherein data can in this case for example may be exchanged wirelessly between the virtual reality glasses 3 and the control device 4.

A method for operating the virtual reality glasses 3 while traveling a route with the motor vehicle 1 will be explained in more detail below. A plurality of virtual individual sequences are provided that can be reproduced by use of the virtual reality glasses 3. The individual sequences can be, for example, individual modules or constituent parts of a virtual game, movie, a virtual sightseeing tour, or the like. In principle, the individual sequences can be any virtual entertainment formats that are capable of being reproduced by use of the virtual reality glasses 3.

While traveling the route, some of the individual sequences provided are reproduced by use of the virtual reality glasses 3. A selection of the individual sequences and a determination of a reproduction order of the selected individual sequences are effected so as to match a characteristic of the route that is travelled with the motor vehicle 1. The selection of the individual sequences and the determination of the reproduction order of the individual sequences in addition take place such that the individual sequences connect a specified entry sequence and end sequence to form a coherent virtual experience. That means that a story that is coherent in itself is built by use of the entry sequence and the end sequence. For example, the vehicle occupant 2 is intended to virtually move from a point A to a point B within a specific time or to take a virtual object from point A to point B within a specific time. The individual virtual individual sequences here connect the entry sequence and the end sequence so as to form a coherent virtual experience for the vehicle occupant 2, that is to say a coherent story experienced by the vehicle occupant 2.

The individual sequences are here selected to match the characteristic of the route, and the reproduction order of the individual sequences is likewise specified according to the characteristic of the route. In addition, the individual sequences are arranged in a series such that they fit to one another in terms of their chronology and thereby connect the entry sequence and the end sequence to form a coherent experience.

In this case, the virtual reality system 5 can remember which of the individual sequences have already been used. In order to create a specific variance and avoid repetitions within a virtual experience, provision may be made here that individual sequences that have already been reproduced earlier are not selected again. Individual sequences that have already been reproduced for the same route can likewise be filtered out so that they are not selected again.

Provision may also be made that, before the journey is started, two or more different virtual experiences are offered to a vehicle occupant from which the vehicle occupant can choose. This possible selection can be displayed for example via the virtual reality glasses 3. The entry sequence and end sequence are specified here to match one of the experiences selected by the vehicle occupant 2. The virtual experiences themselves can be offered to match the characteristic of the route. If the route is already known in its entirety, the selection of the virtual experiences can thus be limited to match the characteristic of the route.

In addition, provision may be made that monitoring is performed to determine whether the vehicle occupant 2 abandons the reproduction of the individual sequences. This can be taken into account when the entry sequences are selected again during a later journey. Likewise, an interrogation can be carried out to determine how much the vehicle occupant 2 enjoyed the reproduction of the individual sequences. In dependence of such an assessment by the vehicle occupant 2, any future selection of the individual sequences can then be made appropriately with respect to the assessment and thus to the respective preferences of the vehicle occupant 2. It is also possible to carry out an interrogation to determine how much the vehicle occupant 2 enjoyed the reproduction order of the individual sequences. Such an assessment can be taken into account for a later compilation of the reproduction order.

Data relating to a height profile, a curve profile, the type of road and/or a journey time for the route can be provided by the vehicle or by use of the virtual reality glasses 3, wherein the characteristic of the route is derived based thereon. It is for example also possible for data describing the characteristic of the route to be provided by use of a smartphone (not illustrated here) that a vehicle occupant 2 carries along. If it is already known before the start of the journey where the vehicle occupant 2 wishes to be driven, wherein, as a result, for example the exact route can also already be known, it is possible to determine the characteristic of the route entirely in advance and to adapt the selection and determination of the reproduction order of the individual sequences to match the characteristic of the route entirely in advance, that is to say before the start of the journey. However, it is also possible that the characteristic of the route is ascertained dynamically as the route is being travelled. In this case, the selection of the reproduction order of the individual sequences can also be adapted dynamically, and always such that the individual sequences connect the specified entry sequence and end sequence to form a coherent experience.

It is thus possible by use of the method and the virtual reality glasses 3 explained for respective virtual experiences that match the respective characteristic of the route to be provided to the vehicle occupant 2 when traveling a wide variety of routes. Real movements of the motor vehicle can thus be embedded into virtual environments of the respective individual sequences so as to seem particularly realistic, wherein the individual sequences in addition connect the entry sequence and the end sequence to form a coherent experience.

The example embodiment explained is also transferable to display systems for motor vehicles that can have display devices of a different type than the virtual reality glasses 3, for example display devices in the form of augmented reality glasses, mixed reality glasses, or a display device that is integrated in a window of the motor vehicle. In the latter case, the display device may be a contact-analog display device that is integrated in the window, e.g., a side window or windshield. The latter can thus be an augmented window of the motor vehicle in question.

A description has been provided with reference to various examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV,* 358 F3d 870, 69 USPQ2d 1865 (Fed. Cir. 2004).

The invention claimed is:

1. A method for operating a display device in a motor vehicle when traveling a route with the motor vehicle, the method comprising:
   providing a plurality of virtual individual sequences which are reproduceable by using the display device; and
   reproducing, using the display device, virtual individual sequences while traveling the route with the motor vehicle, selecting and determining of a reproduction order of the virtual individual sequences being effected so as to match a characteristic of the route and such that the virtual individual sequences connect a specified entry sequence and end sequence to form a virtual game or movie, and selecting the virtual individual sequences for reproducing includes:
      counting, using a counter, a number of journeys a vehicle occupant has undertaken since a specific virtual individual sequence has been reproduced, and, when the counter exceeds a specified value, permitting the specific virtual individual sequence to be selected again, or
      automatically tracking, using a timer, a time that has passed since a specific virtual individual sequence was reproduced, and, when the time exceeds a specified value, permitting the specific virtual sequence to be selected again.

2. The method according to claim 1, wherein virtual individual sequences that have already been reproduced for the route are not selected again during a subsequent journey in which the motor vehicle travels on the route.

3. The method according to claim 1, further comprising:
   offering a plurality of different virtual experiences to the vehicle occupant; and
   specifying the entry sequence and end sequence to match a virtual experience that is selected by the vehicle occupant among the plurality of different virtual experiences offered, so that the selection of the virtual experience specifies the entry sequence and end sequence that frame a series of the virtual individual sequences.

4. The method according to claim 3, wherein the plurality of different virtual experiences are offered so as to match the characteristic of the route.

5. The method according to claim 1, further comprising monitoring whether the vehicle occupant abandons the reproduction of the virtual individual sequences,
   wherein selecting virtual individual sequences during a future journey is further based on the monitoring.

6. The method according to claim 1, further comprising interrogating the vehicle occupant to determine how much the vehicle occupant enjoyed the reproduction of the virtual individual sequences,
   wherein a future selection of virtual individual sequences is made based on feedback provided by the vehicle occupant in response to the interrogating.

7. The method according to claim 1, further comprising interrogating the vehicle occupant to determine how much the vehicle occupant enjoyed the reproduction order of the virtual individual sequences,
   wherein a future determination of a reproduction order of virtual individual sequences is made based on feedback provided by the vehicle occupant in response to the interrogating.

8. The method according to claim 1, further comprising providing data relating to at least one of a height profile, a curve profile, type of roads, or a duration for the route; and
   deriving the characteristic of the route based on the data.

9. A display system for a motor vehicle, comprising:
   a display device; and
   a controller configured to:
      provide a plurality of virtual individual sequences which are reproduceable by using the display device,
      reproduce, using the display device, virtual individual sequences while traveling the route with the motor vehicle, a selection and determination of a reproduction order of the virtual individual sequences being effected by the controller so as to match a characteristic of the route and such that the virtual individual sequences connect a specified entry sequence and end sequence to form a virtual game or movie, and
      select the virtual individual sequences for reproducing by:
         counting, using a counter, a number of journeys a vehicle occupant has undertaken since a specific virtual individual sequence has been reproduced, and, when the counter exceeds a specified value, permitting the specific virtual individual sequence to be selected again, or
         automatically tracking, using a timer, a time that has passed since a specific virtual individual sequence was reproduced, and, when the time exceeds a specified value, permitting the specific virtual sequence to be selected again.

10. The display system according to claim 9, wherein the display device is virtual reality glasses, augmented reality glasses, mixed reality glasses, or a display device integrated in a window of the motor vehicle.

11. The display system according to claim 9, wherein the controller is configured to not select virtual individual sequences that have already been reproduced for the route during a subsequent journey in which the motor vehicle travels on the route.

12. The display system according to claim 9, wherein the controller is configured to:
offer a plurality of different virtual experiences to the vehicle occupant, and
specify the entry sequence and end sequence to match a virtual experience that is selected by the vehicle occupant among the plurality of different virtual experiences offered, so that the selection of the virtual experience specifies the entry sequence and end sequence that frame a series of the virtual individual sequences.

13. The display system according to claim 12, wherein the plurality of different virtual experiences are offered so as to match the characteristic of the route.

14. The display system according to claim 9, wherein the controller is configured to monitor whether the vehicle occupant abandons the reproduction of the virtual individual sequences, and to select virtual individual sequences during a future journey based on the monitoring.

15. The display system according to claim 9, wherein the controller is configured to interrogate the vehicle occupant to determine how much the vehicle occupant enjoyed the reproduction of the virtual individual sequences, and to select virtual individual sequences in a future journey based on feedback provided by the vehicle occupant in response to the interrogation.

16. The display system according to claim 9, wherein the controller is configured to interrogate the vehicle occupant to determine how much the vehicle occupant enjoyed the reproduction order of the virtual individual sequences, and to select a reproduction order of virtual individual sequences in a future journey based on feedback provided by the vehicle occupant in response to the interrogation.

17. The display system according to claim 9, wherein the controller is configured to receive data relating to at least one of a height profile, a curve profile, type of roads, or a duration for the route, and to derive the characteristic of the route based on the data.

18. The display system according to claim 17, wherein the controller is configured to receive the data from at least one of a navigation system of the motor vehicle, a sensor of the motor vehicle, a sensor of the display device, or a sensor of a smartphone.

* * * * *